J. LYTCH
Cotton-Seed Planter.
No. 200,141. Patented Feb. 12, 1878.
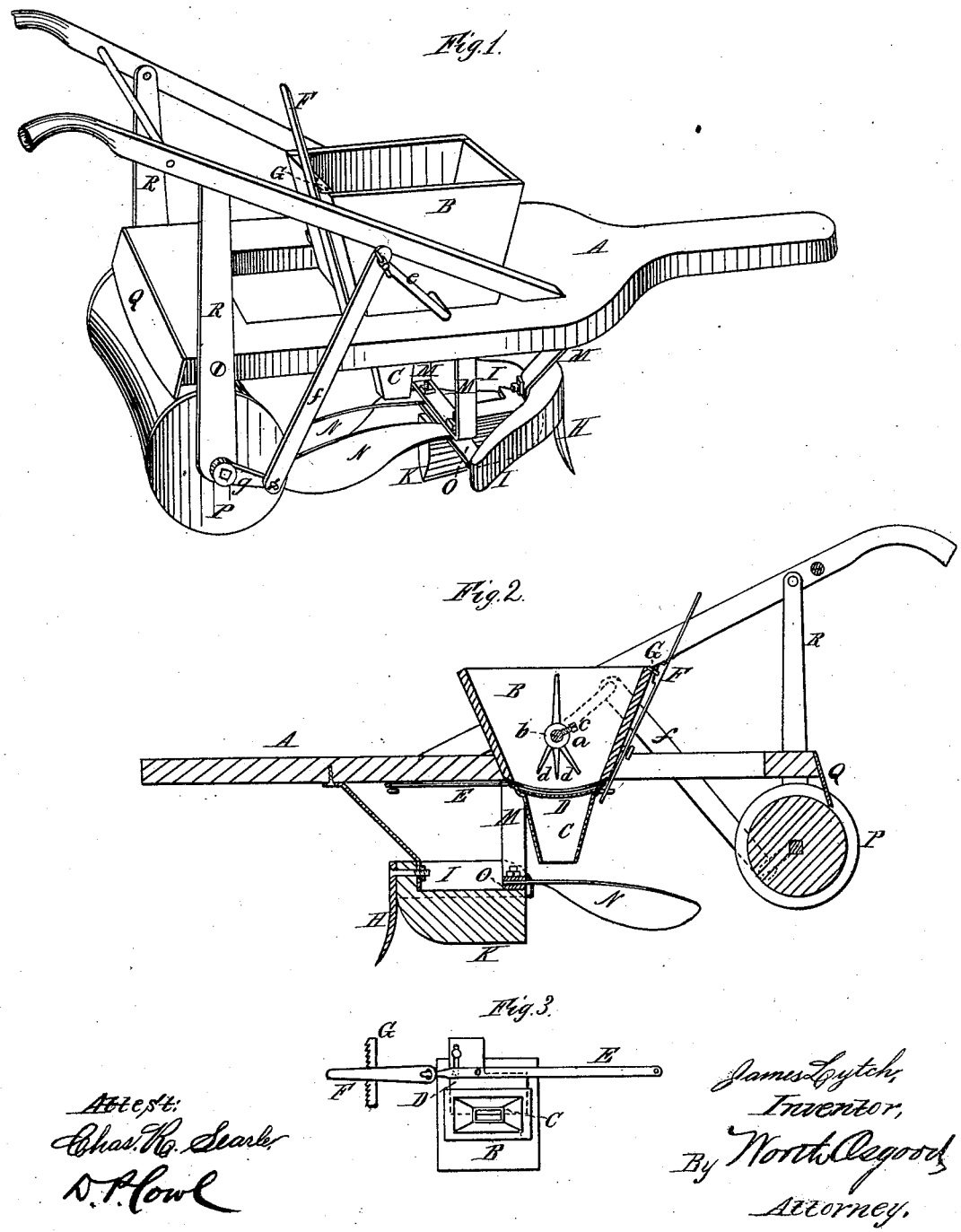

UNITED STATES PATENT OFFICE.

JAMES LYTCH, OF LAURINBURG, NORTH CAROLINA.

IMPROVEMENT IN COTTON-SEED PLANTERS.

Specification forming part of Letters Patent No. 200,141, dated February 12, 1878; application filed December 6, 1877.

*To all whom it may concern:*

Be it known that I, JAMES LYTCH, of Laurinburg, county of Richmond, and State of North Carolina, have invented certain new and useful Improvements in Cotton-Seed Planters, of which the following is a full, clear, and exact description, reference being had to the accompanying drawings, and to the letters of reference marked thereon.

Figure 1 is a perspective view of the complete machine as constructed in accordance with my several improvements. Fig. 2 is a longitudinal section and elevation; and Fig. 3, a plan view of the bottom of the hopper, showing the attachments in their proper location.

Like letters of reference in all the figures indicate corresponding parts.

The object of my invention is to improve and simplify the ordinary cotton-seed planters, rendering them more efficient for the purposes intended, much cheaper, and less liable to get out of order; and to accomplish all of this, the invention consists in certain novel arrangements and combinations of parts, as will be hereinafter first fully described, and then pointed out in the claims.

A is the frame-work of the implement, to which the several operating parts and attachments are braced. B is the hopper, into which a quantity of seed is deposited to be fed down through spout C, terminating just above the ground-line, but extending far enough to prevent the wind from deflecting the current of seed from the furrow formed by the cutting apparatus.

To regulate the quantity of seed passing from the hopper to the spout, I locate the movable bottom D just between the two, pivoting it upon a rod, E, which is hinged to the frame-work A at a point in front of the hopper, and extends to the rear sufficiently to form an attachment for the operating-lever F. This lever is placed upon the rear side of the hopper, and extends above its mouth, so as to be within convenient reach of the driver.

To secure lever F in any desired position, it is made to engage with a ratchet, G, also attached to the rear of hopper B.

This arrangement for regulating the mouth of the hopper is very simple, and is entirely protected from accident by contact with sticks, earth, &c., being located snugly against the bottom and rear wall.

H is the drill or opener, secured to the two wings I I, forming nearly a right angle with each other, and serving to scrape the clods and trash from off the top of the ridges of the furrow, throwing this trash outside the limits of the roller. K is a V-shaped projection located in the direction of the axis of the implement, below the wings I I, and in rear of opener H, serving to press the furrow open to receive the seeds, and terminating at a point in front of the spout C. The wings and projection K may be conveniently cast in a single piece, if desired; but, however constructed, there should be a free open space between the projection and the drill H, so as to prevent the earth from adhering to the under side of the latter.

The wings, the tooth, and the projection are firmly connected with each other, and the whole is securely braced to the frame-work by the bands or strips M M M.

N N are two small wings, curved and bent substantially as shown in the drawings. These follow after the projection K, and serve to return the earth over the seed. They are firmly secured to the band O, and are thus sustained by the braces M M, whereby the earth opening and covering contrivances are all braced from the front part of the machine.

P is the roller following after the coverers. It is greater in diameter at the ends than at the center, as shown, for the purpose of forming the earth upon the row of seeds into a ridge. This form of roller is advantageous, in that it enables the machine to be more easily guided in the proper direction, the ridge forming a sort of track for the roller, and in that the ground is left in better condition for cultivating.

Q is a scraper secured to the rear of the frame-work, and depending over the roller in such proximity as to remove the earth which may adhere thereto, for which purpose said scraper has a curved face, adapted for contact with the surface of the curved roller.

R R are two standards extending above and below the frame-work, to support the handles, and to form a bearing for the journal of the roller.

Within the hopper is the stirrer $a$, made movable upon its shaft $b$, so that it may be adjusted over the variable opening, usually over the center thereof, and capable of being clamped by the set-screw $c$. This stirrer is made to oscillate through the medium of the shaft, and is provided with two or more prongs, $d\ d$, projecting below said shaft, and one above it, which is preferably made longer than the others, and operates to stir the mass of seeds throughout the hopper. The oscillating movement given the stirrers is found to operate more advantageously than the rotating movement, such as has been applied to other forms, since by this motion the mass of seed is less liable to clog up, or to be delivered through the mouth of the hopper in quantities greater than desired.

To communicate the desired motion to the shaft $b$, it is extended slightly beyond the frame-work, where it is formed into a crank, $e$, to which a bar or rod, $f$, is applied, and the axle of the roller P is also provided with a crank, as at $g$, which latter gives motion to the rod. The crank $e$ being longer than that at $g$, it is apparent that as the roller revolves, the shaft $b$ will be caused to oscillate in the manner desired. This method of connecting the roller with the stirrer obviates the necessity of providing any extra driving-wheels, or any complicated mechanism for communicating the desired motion.

When substantially constructed in accordance with the foregoing description, the implement will be found to admirably answer the several objects of the invention, as before specified.

The use of the machine need not be restricted to the planting of cotton-seed alone, as there are other seeds which it is capable of distributing, and which it is not necessary to enumerate.

Having thus fully described my invention, what I claim as new, and desire to secure by Letters Patent, is—

1. The combination of the drill or tooth H, the opener K, located in rear thereof, and leaving an open space between the two, the clearing-wings I I, and the covering-blades N N, the several parts being connected with each other and with the frame-work by means of bars M and O, substantially as shown and described.

2. The combination of the frame A, drill or tooth H, opener K, clearing-wings I I, constructed as shown and described, the blades N N, and the curved covering-roller P, all arranged as and for the purposes set forth.

In testimony that I claim the foregoing I have hereunto set my hand in the presence of two witnesses.

JAMES LYTCH.

Witnesses:
A. CAMERON,
W. MCFARLAND.